(12) United States Patent
Grange et al.

(10) Patent No.: US 9,918,082 B2
(45) Date of Patent: Mar. 13, 2018

(54) CONTINUOUS PREDICTION DOMAIN

(71) Applicant: GOOGLE INC., Mountain View, CA (US)

(72) Inventors: Adrian William Grange, Los Gatos, CA (US); Alexander Jay Converse, San Jose, CA (US)

(73) Assignee: Google LLC, Mountain View, CA (US)

( * ) Notice: Subject to any disclaimer, the term of this patent is extended or adjusted under 35 U.S.C. 154(b) by 296 days.

(21) Appl. No.: 14/518,956

(22) Filed: Oct. 20, 2014

(65) Prior Publication Data

US 2016/0112704 A1   Apr. 21, 2016

(51) Int. Cl.
| | |
|---|---|
| *H04N 7/12* | (2006.01) |
| *H04N 19/503* | (2014.01) |
| *H04N 19/176* | (2014.01) |
| *H04N 19/597* | (2014.01) |
| *G06T 11/00* | (2006.01) |
| *H04N 19/61* | (2014.01) |
| *H04N 19/85* | (2014.01) |

(52) U.S. Cl.
CPC ....... *H04N 19/00575* (2013.01); *G06T 11/00* (2013.01); *H04N 19/00278* (2013.01); *H04N 19/597* (2014.11); *H04N 19/61* (2014.11); *H04N 19/85* (2014.11)

(58) Field of Classification Search
CPC .................................................. H04N 19/597
See application file for complete search history.

(56) References Cited

U.S. PATENT DOCUMENTS

| | | |
|---|---|---|
| 6,356,297 B1 | 3/2002 | Cheng et al. |
| 2001/0050955 A1 | 12/2001 | Zhang et al. |
| 2006/0034374 A1 | 2/2006 | Park et al. |

FOREIGN PATENT DOCUMENTS

| | | |
|---|---|---|
| EP | 1162830 A2 | 12/2001 |
| EP | 2645713 A1 | 10/2013 |
| WO | 2016064862 | 4/2016 |

OTHER PUBLICATIONS

International Search Report and Written Opinion received for PCT Patent Application No. PCT/US2015/056442, dated Feb. 18, 2016, 14 pages.

*Primary Examiner* — Young Lee
(74) *Attorney, Agent, or Firm* — Brake Hughes Bellermann LLP

(57) ABSTRACT

A method for encoding a spherical video is disclosed. The method includes mapping a frame of the spherical video to a two dimensional representation based on a projection. Further, in a prediction process the method includes determine whether at least one block associated with a prediction scheme is on a boundary of the two dimensional representation, and upon determining the at least one block associated with the prediction scheme is on the boundary, select an adjacent end block as a block including at least one pixel for use during the prediction process, the adjacent end block being associated with two or more boundaries of the two dimensional representation.

13 Claims, 13 Drawing Sheets

| Block | Adjacent End Block - column | Adjacent End Block - row |
|---|---|---|
| 415-2 | 425-2 | |
| 440 | 435 | |
| 420 | | 430 |
| ... | ... | ... |

CONTINUOUS PREDICTION DOMAIN

FIELD

Embodiments relate to encoding and decoding a spherical image and a spherical video.

BACKGROUND

Typically, a conventional two dimensional (2D) intra-prediction scheme selects a 1, 2, 3, . . . , n pixel boundary to the left and above the block to be encoded for use in determining residuals from an upper or left reconstructed block. Further, in an inter-prediction scheme, a reference block similar to the block to be encoded is searched, using an evaluation function, for within a search range of at least one reference picture. However, along a boundary of a 2D frame or image there may not be at least one of an upper or left reconstructed block during intra-prediction. Further, the search range may be limited along the boundary during inter-prediction. As a result, there is a need for an intra/inter-prediction scheme where characteristics of a 2D frame or image corresponding to a spherical video or image can be taken advantage of.

SUMMARY

Example embodiments describe techniques for converting spherical images and video to 2D representations and leveraging special characteristics of the 2D representations during encoding/decoding of the images and/or frames of a video.

In a general aspect, a method for encoding a spherical video can include mapping a frame of the spherical video to a two dimensional representation based on a projection. Further, in a prediction process the method can include determining whether at least one block associated with a prediction scheme is on a boundary of the two dimensional representation, and upon determining the at least one block associated with the prediction scheme is on the boundary, select an adjacent end block as a block including at least one pixel for use during the prediction process, the adjacent end block being associated with two or more boundaries of the two dimensional representation.

Implementations can include one or more of the following features. For example, the prediction process can be an intra-prediction process, the at least one block associated with the prediction scheme can be a block to be encoded, and the adjacent end block can be selected as one of a left reconstructed block or an upper reconstructed block of the block to be encoded. The prediction process can be an inter-prediction process, and the at least one block associated with the prediction scheme can be a block included in a plurality of blocks in a reference frame to be searched for a matching block. The prediction process can be an inter-prediction process, and the at least one block associated with the prediction scheme can be selected as a prediction block from a plurality of blocks in a reference frame to be searched, the plurality of blocks crossing a boundary of the reference frame.

For example, the mapping of the frame of the spherical video to the two dimensional representation can include using an equation based on an equirectangular projection. The mapping of the frame of the spherical video to the two dimensional representation can include using an equation based on a semi-equirectangular projection. For example, the method can further include upon determining the block to be encoded is away from the boundary, in an intra-prediction process, select an adjacent block as a template, the adjacent end block being at least one of a left reconstructed block or an upper reconstructed block of the block to be encoded. The selecting of the adjacent end block includes selecting a reconstructed block from at least one of an opposite end of a same row as the block associated with the prediction scheme or an opposite end of a same column as the block to be encoded. The selecting of the adjacent end block includes selecting a reconstructed block from a look-up table.

For example, the method can further include generating at least one residual based on un-encoded pixels of a block to be encoded, encoding the at least one residual by applying a transform to a residual block including the at least one residual, quantizing transform coefficients associated with the encoded at least one residual, entropy encoding the quantized transform coefficients as a compressed video bit stream, and transmitting the compressed video bit stream including a header indicating a intra-frame coding mode, the intra-frame coding mode indicating a technique used during the mapping of the frame of the spherical video to the two dimensional representation.

In a general aspect, a method for decoding a spherical video includes receiving an encoded bit stream including a header indicating a intra-frame coding mode, the intra-frame coding mode indicating a technique used during a conversion of a frame of a spherical video to a two dimensional representation. Further, in a prediction process the method can include determining whether at least one block associated with a prediction scheme is on a boundary of the two dimensional representation, upon determining the at least one block associated with the prediction scheme is on the boundary, select an adjacent end block as a block including at least one pixel for use during the prediction process the adjacent end block being associated with two or more boundaries of the two dimensional representation. The method further includes converting the two dimensional representation to a frame of the spherical video based on a cylindrical projection.

Implementations can include one or more of the following features. For example, the converting of the two dimensional representation can include mapping the two dimensional representation to a spherical image using an equation based on inverse transformation of a projection. The prediction process can be an intra-prediction process, the at least one block associated with the prediction scheme can be a block to be encoded, and the adjacent end block can be selected as one of a left reconstructed block or an upper reconstructed block. For example, the prediction process can be an inter-prediction process, and the at least one block associated with the prediction scheme can be a block included in a plurality of blocks in a reference frame to be searched for a matching block. The prediction process can be an inter-prediction process, and the at least one block associated with the prediction scheme can be selected as a prediction block from a plurality of blocks in a reference frame to be searched, the plurality of blocks crossing a boundary of the reference frame.

In a general aspect, a non-transitory computer-readable storage medium may have stored thereon computer executable program code which, when executed on a computer system, causes the computer system to perform steps including mapping a frame of the spherical video to a two dimensional representation based on a projection. Further, in a prediction process, the steps can include determining whether at least one block associated with a prediction scheme is on a boundary of the two dimensional representation, and upon determining the at least one block associated with the prediction scheme is on the boundary, select an adjacent end block as a block including at least one pixel for use during the prediction process, the adjacent end block being associated with two or more boundaries of the two dimensional representation.

Implementations can include one or more of the following features. For example, the prediction process can be an intra-prediction process, the at least one block associated with the prediction scheme can be a block to be encoded, and the adjacent end block can be selected as one of a left reconstructed block or an upper reconstructed block of the block to be encoded. For example, the prediction process can be an inter-prediction process, and the at least one block associated with the prediction scheme can be a block included in a plurality of blocks in a reference frame to be searched for a matching block. The prediction process can be an inter-prediction process, and the at least one block associated with the prediction scheme can be selected as a prediction block from a plurality of blocks in a reference frame to be searched, the plurality of blocks crossing a boundary of the reference frame. The selecting of the adjacent end block can include selecting a reconstructed block from at least one of an opposite end of a same row as the block associated with the prediction scheme or an opposite end of a same column as the block to be encoded.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1A:
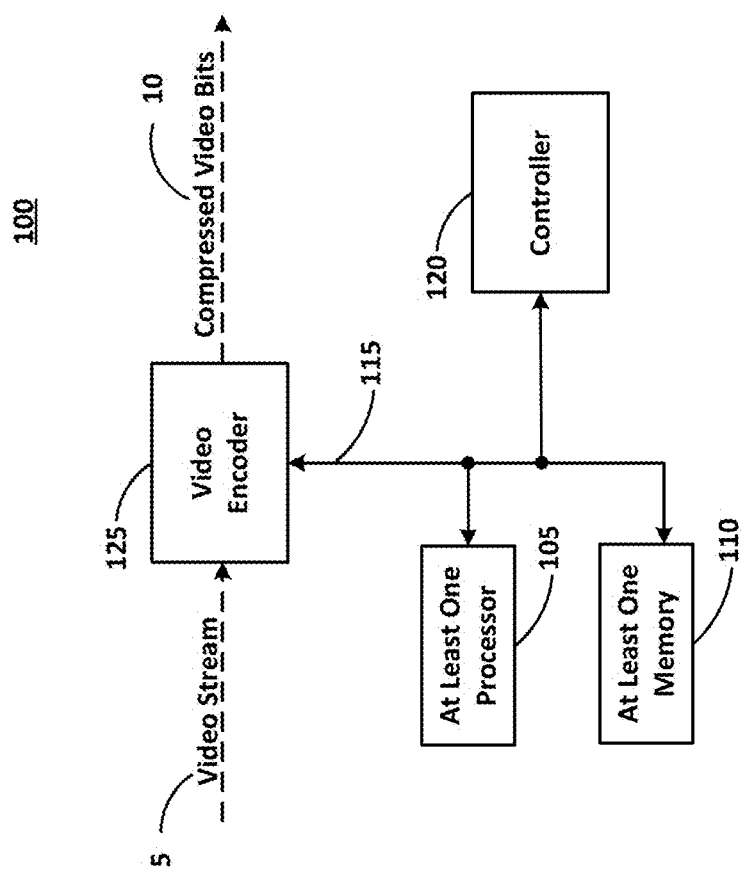
FIG. 1A illustrates a video encoder system according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

In the example of FIG. 1A, a video encoder system 100 may be, or include, at least one computing device and can represent virtually any computing device configured to perform the methods described herein. As such, the video encoder system 100 can include various components which may be utilized to implement the techniques described herein, or different or future versions thereof. By way of example, the video encoder system 100 is illustrated as including at least one processor 105, as well as at least one memory 110 (e.g., a non-transitory computer readable storage medium).

FIG. 1A illustrates the video encoder system according to at least one example embodiment. As shown in FIG. 1A, the video encoder system 100 includes the at least one processor 105, the at least one memory 110, a controller 120, and a video encoder 125. The at least one processor 105, the at least one memory 110, the controller 120, and the video encoder 125 are communicatively coupled via bus 115.

The at least one processor 105 may be utilized to execute instructions stored on the at least one memory 110, so as to thereby implement the various features and functions described herein, or additional or alternative features and functions. The at least one processor 105 and the at least one memory 110 may be utilized for various other purposes. In particular, the at least one memory 110 can represent an example of various types of memory and related hardware and software which might be used to implement any one of the modules described herein.

The at least one memory 110 may be configured to store data and/or information associated with the video encoder system 100. For example, the at least one memory 110 may be configured to store codecs associated with intra-prediction and/or mapping spherical video or images to 2D representations of the spherical video or images. The at least one memory 110 may be a shared resource. For example, the video encoder system 100 may be an element of a larger system (e.g., a server, a personal computer, a mobile device, and the like). Therefore, the at least one memory 110 may be configured to store data and/or information associated with other elements (e.g., image/video serving, web browsing or wired/wireless communication) within the larger system.

The controller 120 may be configured to generate various control signals and communicate the control signals to various blocks in video encoder system 100. The controller 120 may be configured to generate the control signals to implement the techniques described below. The controller 120 may be configured to control the video encoder 125 to encode an image, a sequence of images, a video frame, a video sequence, and the like according to example embodiments. For example, the controller 120 may generate control signals corresponding to inter-prediction, intra-prediction and/or mapping spherical video or images to 2D representations of the spherical video or images. More details related to the functions and operation of the video encoder 125 and controller 120 will be described below in connection with at least FIGS. 5 and 6.

The video encoder 125 may be configured to receive a video stream input 5 and output compressed (e.g., encoded) video bits 10. The video encoder 125 may convert the video stream input 5 into discrete video frames. The video stream input 5 may also be an image, accordingly, the compressed (e.g., encoded) video bits 10 may also be compressed image bits. The video encoder 125 may further convert each discrete video frame (or image) into a C×R matrix of blocks (hereinafter referred to as blocks or as macroblocks). For example, a video frame (or image) may be converted to a matrix of 16×16, a 16×8, an 8×8, a 4×4 or a 2×2 blocks each having a number of pixels. Although five example matrices are listed, example embodiments are not limited thereto.

The compressed video bits 10 may represent the output of the video encoder system 100. For example, the compressed video bits 10 may represent an encoded video frame (or an encoded image). For example, the compressed video bits 10 may be ready for transmission to a receiving device (not shown). For example, the video bits may be transmitted to a system transceiver (not shown) for transmission to the receiving device.

The at least one processor 105 may be configured to execute computer instructions associated with the controller 120 and/or the video encoder 125. The at least one processor 105 may be a shared resource. For example, the video encoder system 100 may be an element of a larger system (e.g., a mobile device). Therefore, the at least one processor 105 may be configured to execute computer instructions associated with other elements (e.g., image/video serving, web browsing or wired/wireless communication) within the larger system.

Figure 1B:
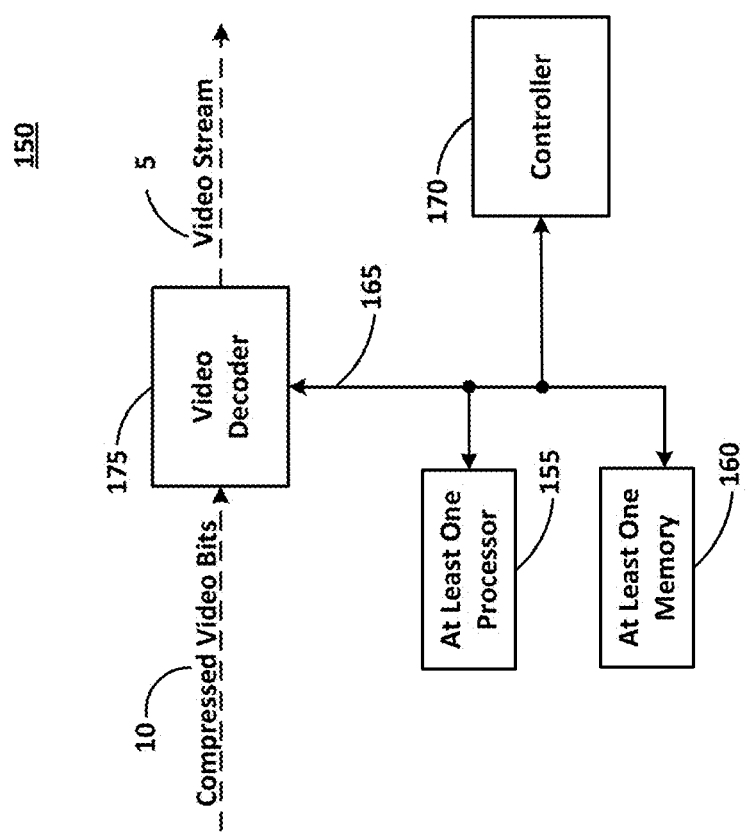
FIG. 1B illustrates a video decoder system according to at least one example embodiment.

In the example of FIG. 1B, a video decoder system 150 may be at least one computing device and can represent virtually any computing device configured to perform the methods described herein. As such, the video decoder system 150 can include various components which may be utilized to implement the techniques described herein, or different or future versions thereof. By way of example, the video decoder system 150 is illustrated as including at least one processor 155, as well as at least one memory 160 (e.g., a computer readable storage medium).

Thus, the at least one processor 155 may be utilized to execute instructions stored on the at least one memory 160, so as to thereby implement the various features and functions described herein, or additional or alternative features and functions. The at least one processor 155 and the at least one memory 160 may be utilized for various other purposes. In particular, the at least one memory 160 can represent an example of various types of memory and related hardware and software which might be used to implement any one of the modules described herein. According to example embodiments, the video encoder system 100 and the video decoder system 150 may be included in a same larger system (e.g., a personal computer, a mobile device and the like). The video decoder system 150 can be configured to perform the opposite or reverse operations of the encoder 100.

The at least one memory 160 may be configured to store data and/or information associated with the video decoder system 150. For example, the at least one memory 110 may be configured to store inter-prediction, intra-prediction and/or mapping spherical video or images to 2D representations of the spherical video or images. The at least one memory 160 may be a shared resource. For example, the video decoder system 150 may be an element of a larger system (e.g., a personal computer, a mobile device, and the like). Therefore, the at least one memory 160 may be configured to store data and/or information associated with other elements (e.g., web browsing or wireless communication) within the larger system.

The controller 170 may be configured to generate various control signals and communicate the control signals to various blocks in video decoder system 150. The controller 170 may be configured to generate the control signals in order to implement the video decoding techniques described below. The controller 170 may be configured to control the video decoder 175 to decode a video frame according to example embodiments. The controller 170 may be configured to generate control signals corresponding to intra-prediction and/or mapping spherical video or images to 2D representations of the spherical video or images. More details related to the functions and operation of the video decoder 175 and controller 170 will be described below in connection with at least FIGS. 7 and 8.

The video decoder 175 may be configured to receive a compressed (e.g., encoded) video bits 10 input and output a video stream 5. The video decoder 175 may convert discrete video frames of the compressed video bits 10 into the video stream 5. The compressed (e.g., encoded) video bits 10 may also be compressed image bits, accordingly, the video stream 5 may also be an image.

The at least one processor 155 may be configured to execute computer instructions associated with the controller 170 and/or the video decoder 175. The at least one processor 155 may be a shared resource. For example, the video decoder system 150 may be an element of a larger system (e.g., a personal computer, a mobile device, and the like). Therefore, the at least one processor 155 may be configured to execute computer instructions associated with other elements (e.g., web browsing or wireless communication) within the larger system.

Figure 2A:
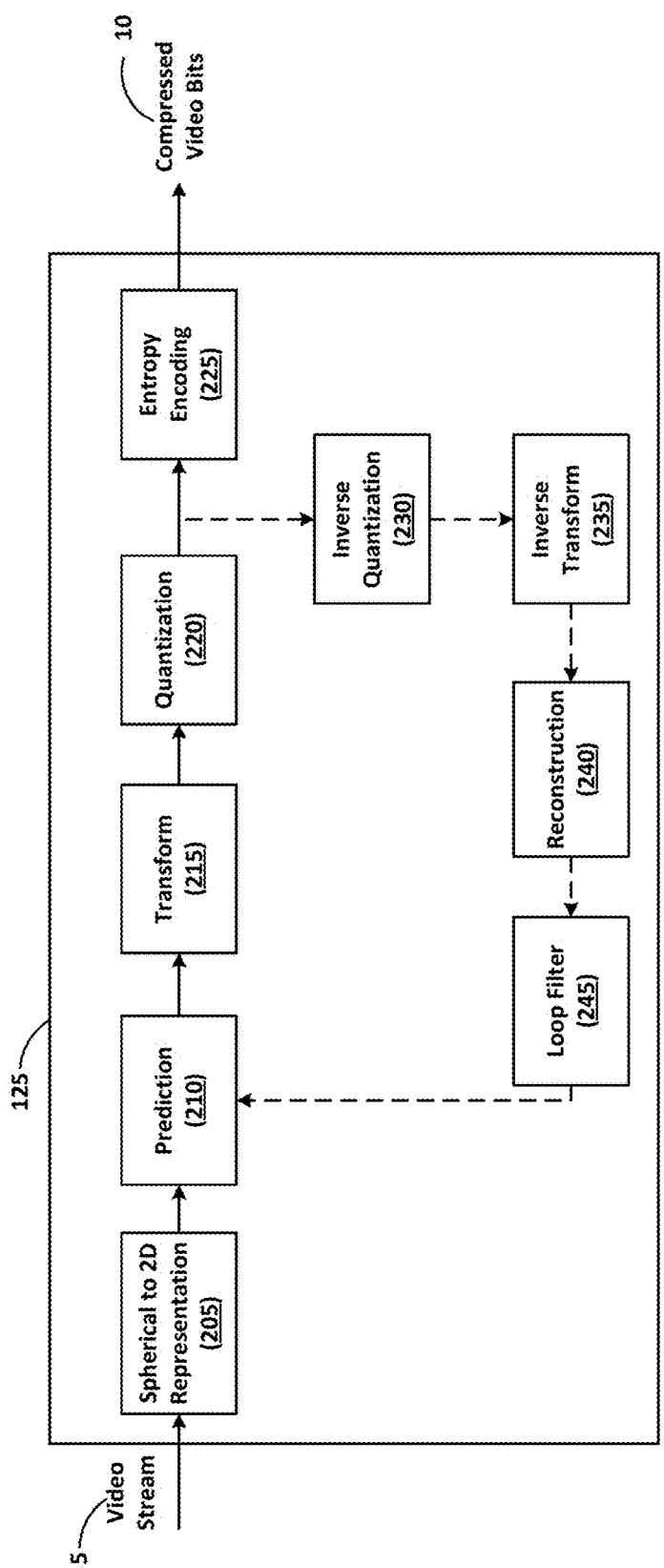
FIG. 2A illustrates a flow diagram for a video encoder system according to at least one example embodiment.
Figure 2B:
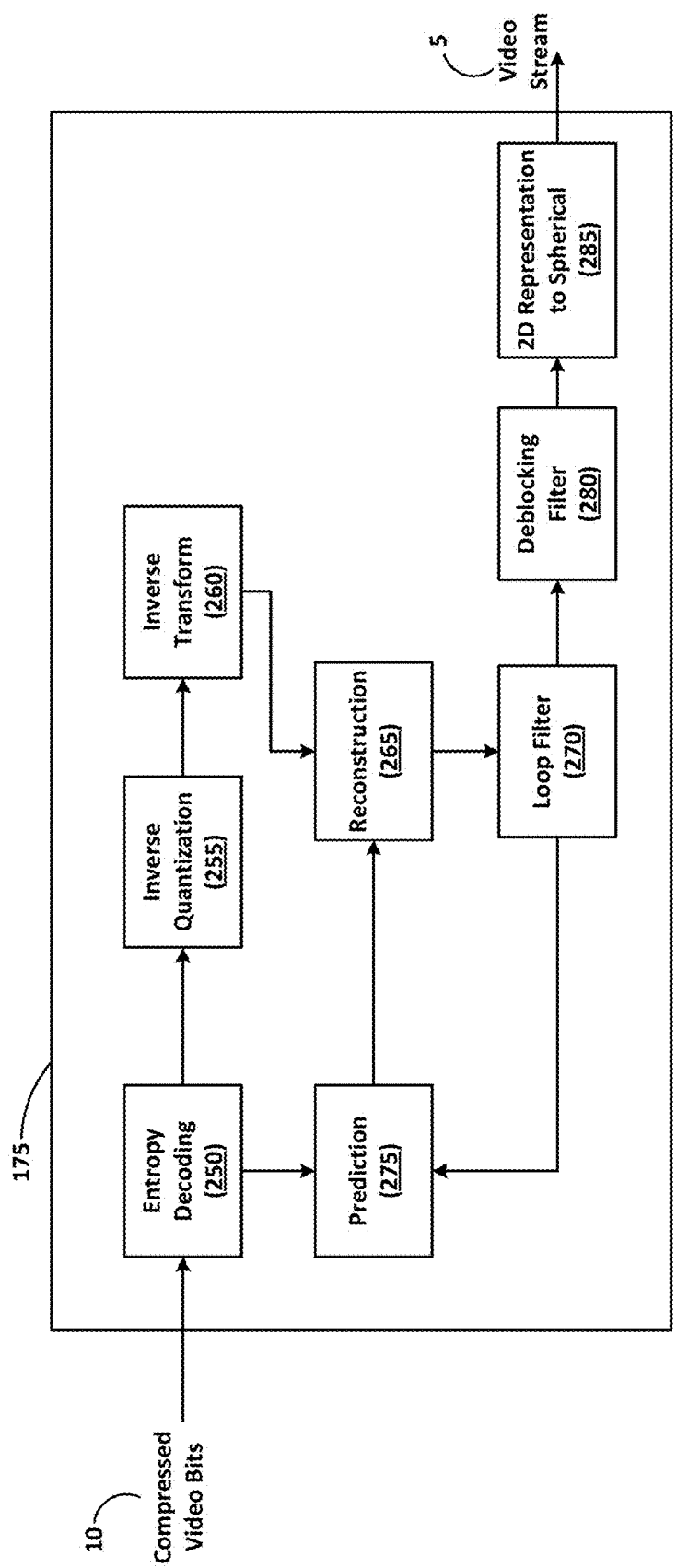
FIG. 2B illustrates a flow diagram for a video decoder system according to at least one example embodiment.

FIGS. 2A and 2B illustrate a flow diagram for the video encoder 125 shown in FIG. 1A and the video decoder 175 shown in FIG. 1B, respectively, according to at least one example embodiment. The video encoder 125 (described above) includes a spherical to 2D representation block 205, a prediction block 210, a transform block 215, a quantization block 220, an entropy encoding block 225, an inverse quantization block 230, an inverse transform block 235, a reconstruction block 240, and a loop filter block 245. Other structural variations of video encoder 125 can be used to encode input video stream 5. As shown in FIG. 2A, dashed lines represent a reconstruction path amongst the several blocks and solid lines represent a forward path amongst the several blocks.

Each of the aforementioned blocks may be executed as software code stored in a memory (e.g., at least one memory 110) associated with a video encoder system (e.g., as shown in FIG. 1A) and executed by at least one processor (e.g., at least one processor 105) associated with the video encoder system. However, alternative embodiments are contemplated such as a video encoder embodied as a special purpose processor. For example, each of the aforementioned blocks (alone and/or in combination) may be an application-specific integrated circuit, or ASIC. For example, the ASIC may be configured as the transform block 215 and/or the quantization block 220.

Figure 4A:
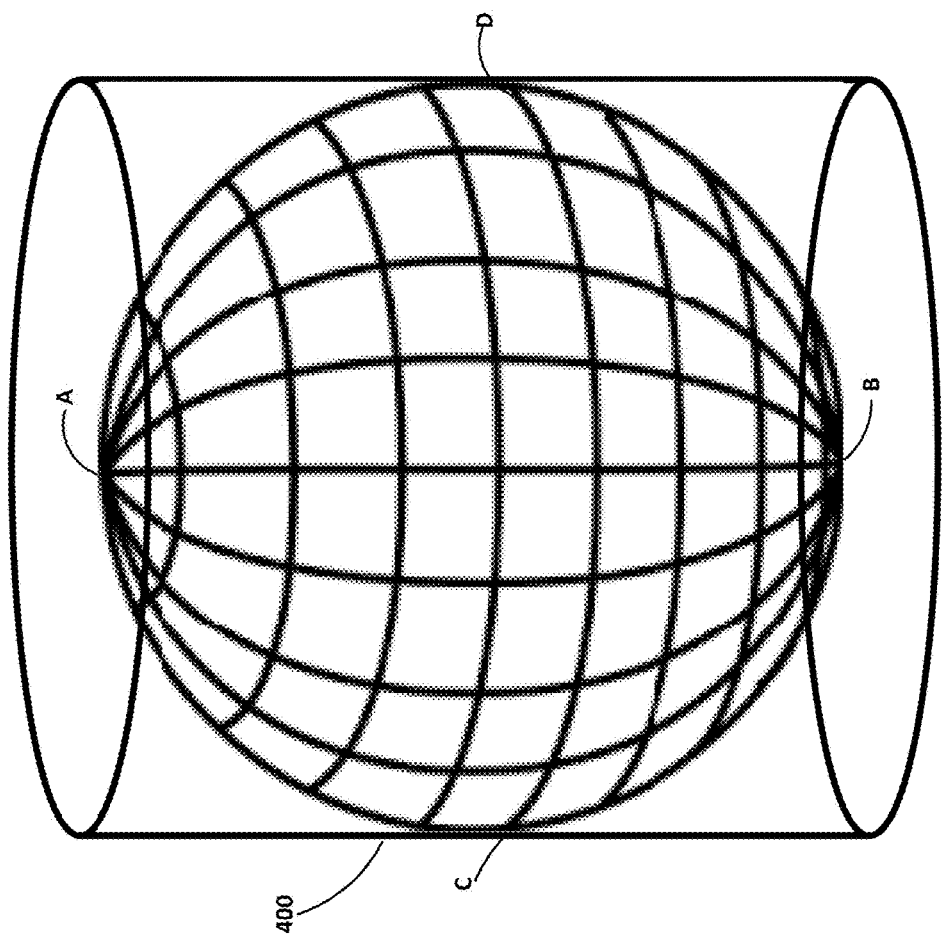
FIG. 4A illustrates a spherical image within a cylinder according to at least one example embodiment.

The spherical to 2D representation block 205 may be configured to map a spherical frame or image to a 2D representation of the spherical frame or image. For example, FIG. 4A illustrates the sphere 300 (e.g., as a frame or an image) inside of a cylinder 400. The sphere 300 can be projected onto the surface of the cylinder 400. The projection can be, for example, equirectangular or semi-equirectangular. Mapping a spherical frame or image to a 2D representation of the spherical frame or image is described in more detail below with regard to FIG. 5.

The prediction block 210 may be configured to utilize video frame coherence (e.g., pixels that have not changed as compared to previously encoded pixels). Prediction may include two types. For example, prediction may include intra-frame prediction and inter-frame prediction. Intra-frame prediction relates to predicting the pixel values in a block of a picture relative to reference samples in neighboring, previously coded blocks of the same picture. In intra-frame prediction, a sample is predicted from reconstructed pixels within the same frame for the purpose of reducing the residual error that is coded by the transform (e.g., entropy encoding block 225) and entropy coding (e.g., entropy encoding block 225) part of a predictive transform codec. Inter-frame prediction relates to predicting the pixel values in a block of a picture relative to data of at least one previously coded picture.

The transform block 215 may be configured to convert the values of the pixels from the spatial domain to transform coefficients in a transform domain. The transform coefficients may correspond to a two-dimensional matrix of coefficients that can be the same size as the original block. In other words, there may be as many transform coefficients as pixels in the original block. However, due to the transform, a portion of the transform coefficients may have values equal to zero.

The transform block 215 may be configured to transform the residual (from the prediction block 210) into transform coefficients in, for example, the frequency domain. The transforms can include the Karhunen-Loève Transform (KLT), the Discrete Cosine Transform ("DCT"), the Singular Value Decomposition Transform ("SVD") and the asymmetric discrete sine transform (ADST).

The quantization block 220 may be configured to reduce the data in each transformation coefficient. Quantization may involve mapping values within a relatively large range to values in a relatively small range, thus reducing the amount of data needed to represent the quantized transform coefficients. The quantization block 220 may convert the transform coefficients into discrete quantum values, which are referred to as quantized transform coefficients or quantization levels. For example, the quantization block 220 may be configured to add zeros to the data associated with a transformation coefficient. For example, an encoding standard may define 128 quantization levels in a scalar quantization process.

The quantized transform coefficients are then entropy encoded by entropy encoding block 225. The entropy-encoded coefficients, together with the information required to decode the block, such as the type of prediction used, motion vectors and quantizer value, are then output as the compressed video bits 10. The compressed video bits 10 can be formatted using various techniques, such as run-length encoding (RLE) and zero-run coding.

The reconstruction path in FIG. 2A is present to ensure that both the video encoder 125 and the video decoder 175 (described below with regard to FIG. 2B) use the same reference frames to decode compressed video bits 10 (or compressed image bits). The reconstruction path performs functions that are similar to functions that take place during the decoding process that are discussed in more detail below, including inverse quantizing the quantized transform coefficients at the inverse quantization block 230 and inverse transforming the inverse quantized transform coefficients at the inverse transform block 235 in order to produce a derivative residual block (derivative residual). At the reconstruction block 240, the prediction block that was predicted at the prediction block 210 can be added to the derivative residual to create a reconstructed block. A loop filter 245 can then be applied to the reconstructed block to reduce distortion such as blocking artifacts.

The video encoder 125 described above with regard to FIG. 2A includes the blocks shown. However, example embodiments are not limited thereto. Additional blocks may be added based on the different video encoding configurations and/or techniques used. Further, each of the blocks shown in the video encoder 125 described above with regard to FIG. 2A may be optional blocks based on the different video encoding configurations and/or techniques used.

FIG. 2B is a schematic block diagram of a decoder 175 configured to decode compressed video bits 10 (or compressed image bits). Decoder 175, similar to the reconstruction path of the encoder 125 discussed previously, includes an entropy decoding block 250, an inverse quantization block 255, an inverse transform block 260, a reconstruction block 265, a loop filter block 270, a prediction block 275, a deblocking filter block 280 and a 2D representation to spherical block 285.

The data elements within the compressed video bits 10 can be decoded by entropy decoding block 250 (using, for example, Context Adaptive Binary Arithmetic Decoding) to produce a set of quantized transform coefficients. Inverse quantization block 255 dequantizes the quantized transform coefficients, and inverse transform block 260 inverse transforms (using ADST) the dequantized transform coefficients to produce a derivative residual that can be identical to that created by the reconstruction stage in the encoder 125.

Using header information decoded from the compressed video bits 10, decoder 175 can use prediction block 275 to create the same prediction block as was created in encoder 175. The prediction block can be added to the derivative residual to create a reconstructed block by the reconstruction block 265. The loop filter block 270 can be applied to the reconstructed block to reduce blocking artifacts. Deblocking filter block 280 can be applied to the reconstructed block to reduce blocking distortion, and the result is output as video stream 5.

The 2D representation to spherical block 285 may be configured to map a 2D representation of a spherical frame or image to a spherical frame or image. For example, FIG. 4A illustrates the sphere 300 (e.g., as a frame or an image) inside of a cylinder 400. The sphere 300 could have been previously projected onto the surface of the cylinder 400. The projection can be, for example, equirectangular or semi-equirectangular. The mapping of the 2D representation of a spherical frame or image to the spherical frame or image can be the inverse of the previous mapping. Mapping a 2D representation of the spherical frame or image to a spherical frame or image is described in more detail below with regard to FIG. 8.

The video decoder 175 described above with regard to FIG. 2B includes the blocks shown. However, example embodiments are not limited thereto. Additional blocks may be added based on the different video encoding configurations and/or techniques used. Further, each of the blocks shown in the video decoder 175 described above with regard to FIG. 2B may be optional blocks based on the different video encoding configurations and/or techniques used.

The encoder 125 and the decoder may be configured to encode spherical video and/or images and to decode spherical video and/or images, respectively. A spherical image is an image that includes a plurality of pixels spherically organized. In other words, a spherical image is an image that is continuous in all directions. Accordingly, a viewer of a spherical image can reposition (e.g., move her head or eyes) in any direction (e.g., up, down, left, right, or any combination thereof) and continuously see a portion of the image.

A spherical image can have perspective. For example, a spherical image could be an image of a globe. An inside perspective could be a view from a center of the globe looking outward. Or the inside perspective could be on the globe looking out to space. An outside perspective could be a view from space looking down toward the globe. As another example, perspective can be based on that which is viewable. In other words, a viewable perspective can be that which can be seen by a viewer. The viewable perspective can be a portion of the spherical image that is in front of the viewer. For example, when viewing from an inside perspective, a viewer could be lying on the ground (e.g., earth) and looking out to space. The viewer may see, in the image, the moon, the sun or specific stars. However, although the ground the viewer is lying on is included in the spherical image, the ground is outside the current viewable perspective. In this example, the viewer could turn her head and the ground would be included in a peripheral viewable perspective. The viewer could flip over and the ground would be in the viewable perspective whereas the moon, the sun or stars would not.

A viewable perspective from an outside perspective may be a portion of the spherical image that is not blocked (e.g., by another portion of the image) and/or a portion of the spherical image that has not curved out of view. Another portion of the spherical image may be brought into a viewable perspective from an outside perspective by moving (e.g., rotating) the spherical image and/or by movement of the spherical image. Therefore, the viewable perspective is a portion of the spherical image that is within a viewable range of a viewer of the spherical image.

A spherical image is an image that does not change with respect to time. For example, a spherical image from an inside perspective as relates to the earth may show the moon and the stars in one position. Whereas a spherical video (or sequence of images) may change with respect to time. For example, a spherical video from an inside perspective as relates to the earth may show the moon and the stars moving (e.g., because of the earths rotation) and/or an airplane streak across the image (e.g., the sky).

Figure 3:
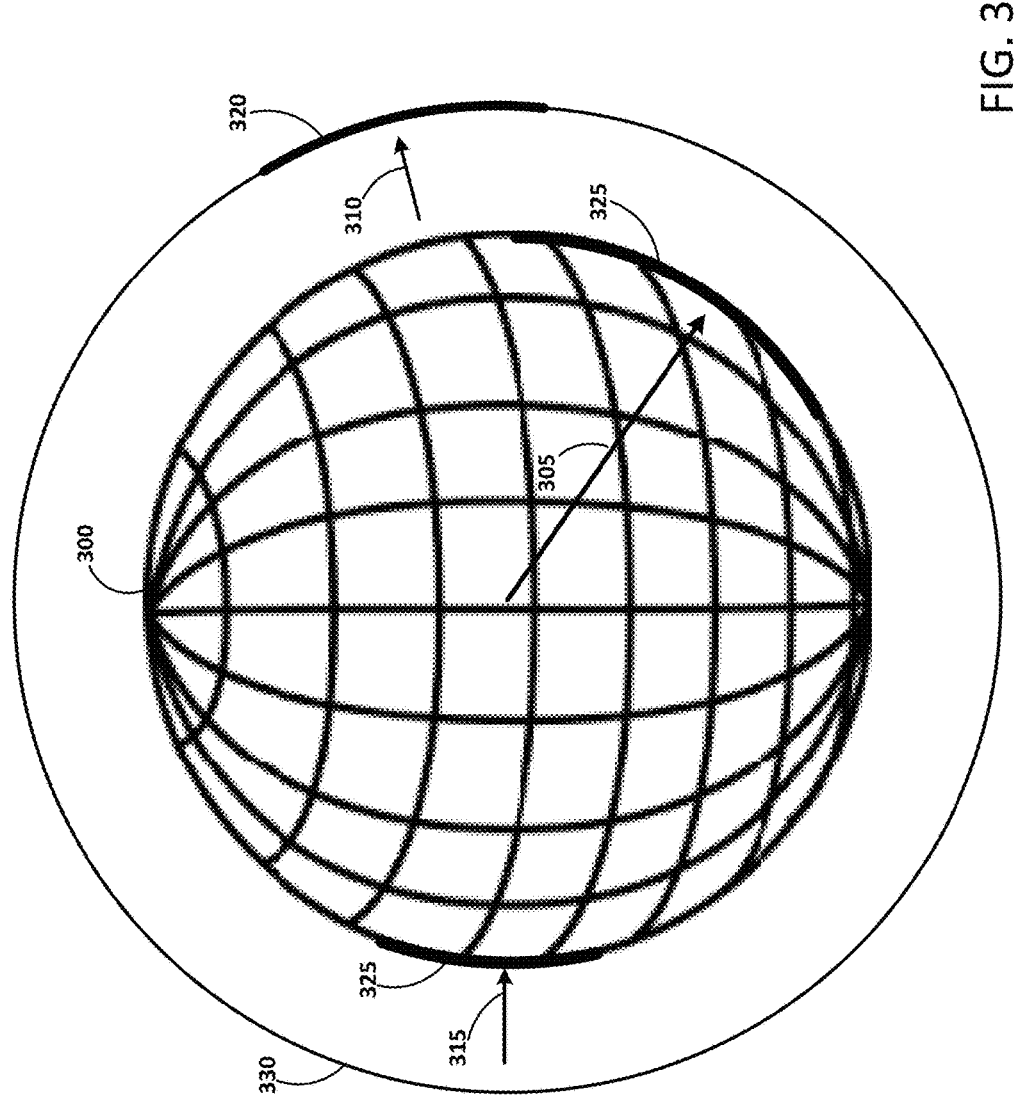
FIG. 3 illustrates a two dimensional (2D) representation of a sphere according to at least one example embodiment.

FIG. 3 is a two dimensional (2D) representation of a sphere. As shown in FIG. 3, the sphere 300 (e.g., as a spherical image) illustrates a direction of inside perspective 305, 310, outside perspective 315 and viewable perspective 320, 325, 330. The viewable perspective 320 may be a portion of a spherical image 335 as viewed from inside perspective 310. The viewable perspective 320 may be a portion of the sphere 300 as viewed from inside perspective 305. The viewable perspective 325 may be a portion of the sphere 300 as viewed from outside perspective 315.

FIGS. 5-8 are flowcharts of methods according to example embodiments. The steps described with regard to FIGS. 5-8 may be performed due to the execution of software code stored in a memory (e.g., at least one memory 110) associated with an apparatus (e.g., as shown in FIG. 1) and executed by at least one processor (e.g., at least one processor 105) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 5-8.

Figure 5:
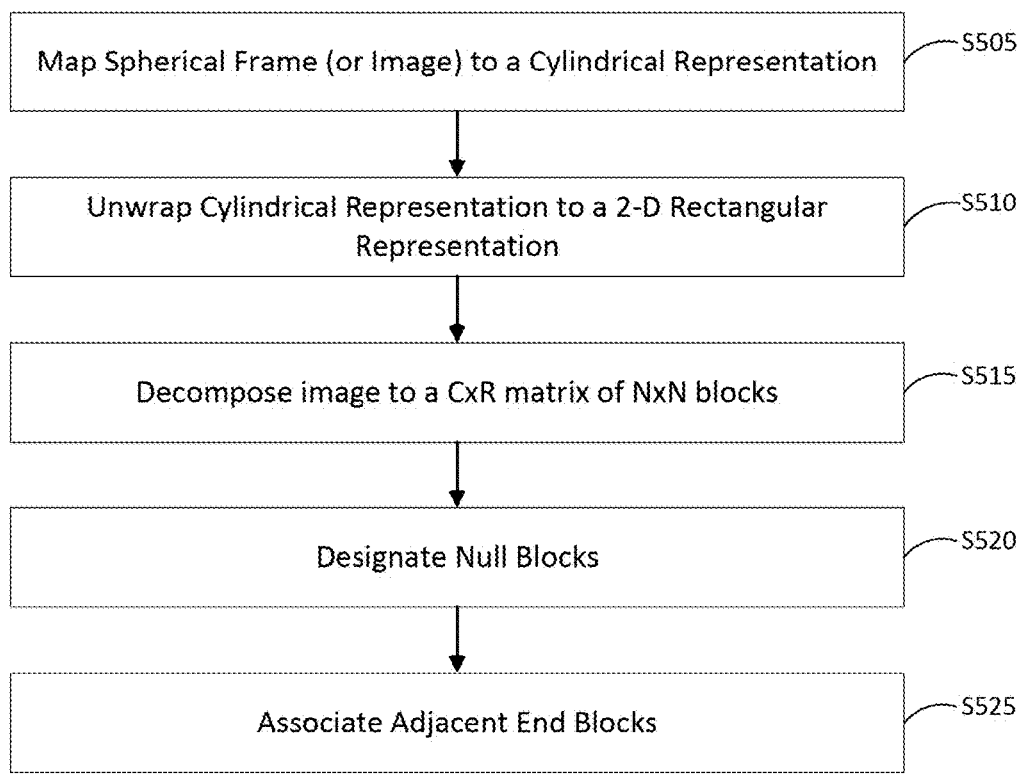
FIG. 5 is a flowchart of a method for mapping a spherical frame/image to a 2D representation of the spherical frame/image according to at least one example embodiment.
Figure 6:
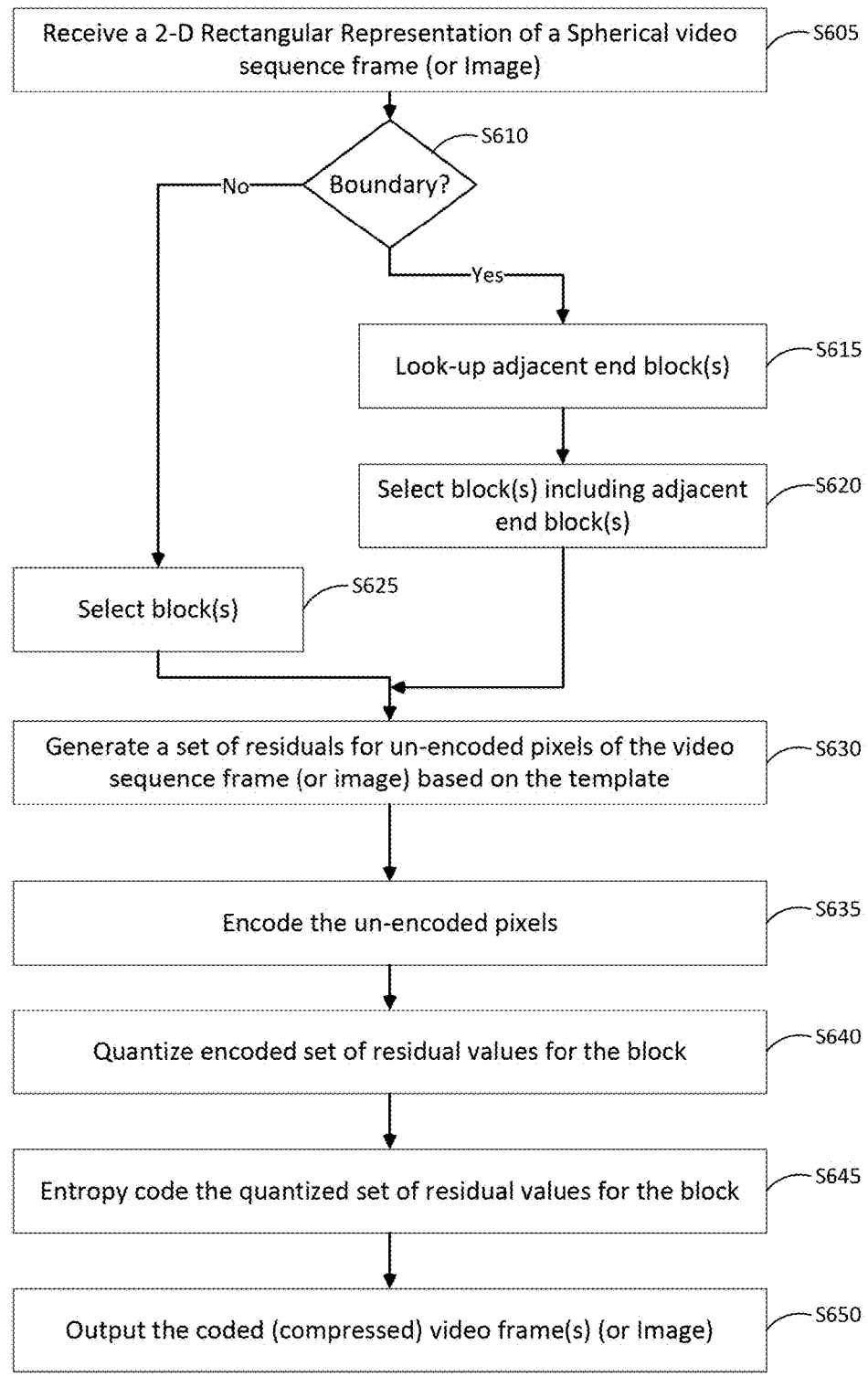
FIGS. 6 and 7 are flowcharts of a method for encoding/decoding a video frame according to at least one example embodiment.

FIG. 5 is a flowchart of a method for mapping a spherical image to a 2D representation of the spherical image according to at least one example embodiment. As shown in FIG. 5, in step S505 a spherical frame (or image) is mapped to a cylindrical representation. The mapping (or conversion) can include mapping a frame of a spherical video or the image or to a 2D representation based on a spherical to cylindrical projection. For example, FIG. 4A illustrates the sphere 300 (e.g., as a frame or an image) inside of a cylinder 400. The sphere 300 can be projected onto the surface of the cylinder 400. In one example implementation, the projection can be equirectangular. For example, a line between points C and D can be equidistant between poles A and B. The line between points C and D can be projected onto the cylinder 400. In other words pixels along the line between points C and D are mapped to an equidistant line (between the top and the bottom of the cylinder 400) around the circumference of the cylinder 400. Then, moving away (up and down from the line between points C and D, each horizontal line is mapped to the cylinder as a straight line across the middle of the image with the vertical line remaining vertical. As the horizontal line gets closer and closer to the poles A and B, the image can be stretched to fit to the cylinder. Mathematically the equirectangular projection can be defined as $x=\lambda \cos \theta$ and $y=\theta$ where where $\lambda$ is the longitude and $\theta$ is the latitude.

In another example implementation, the projection can be semi-equirectangular. In a semi-equirectangular projection, each horizontal line is mapped to the cylinder as a straight line across the middle of the image with the vertical line remaining vertical as in the equirectangular projection. However, as the horizontal line gets closer and closer to the poles A and B, the image can be projected onto the cylinder without stretching or with reduced stretching (e.g., scaled). In the semi-equirectangular projection portions of the image projected on to the cylinder are empty or null pixels. The empty or null pixels may be represented as black or white (or some other constant pixel representation) pixels. Mathematically the semi-equirectangular projection can be defined as $x=a\lambda \cos \theta$ and $y=b\theta$ where where $\lambda$ is the longitude and $\theta$ is the latitude and where a and b are scaling factors. Other cylindrical projections are within the scope of this disclosure.

Figure 4B:
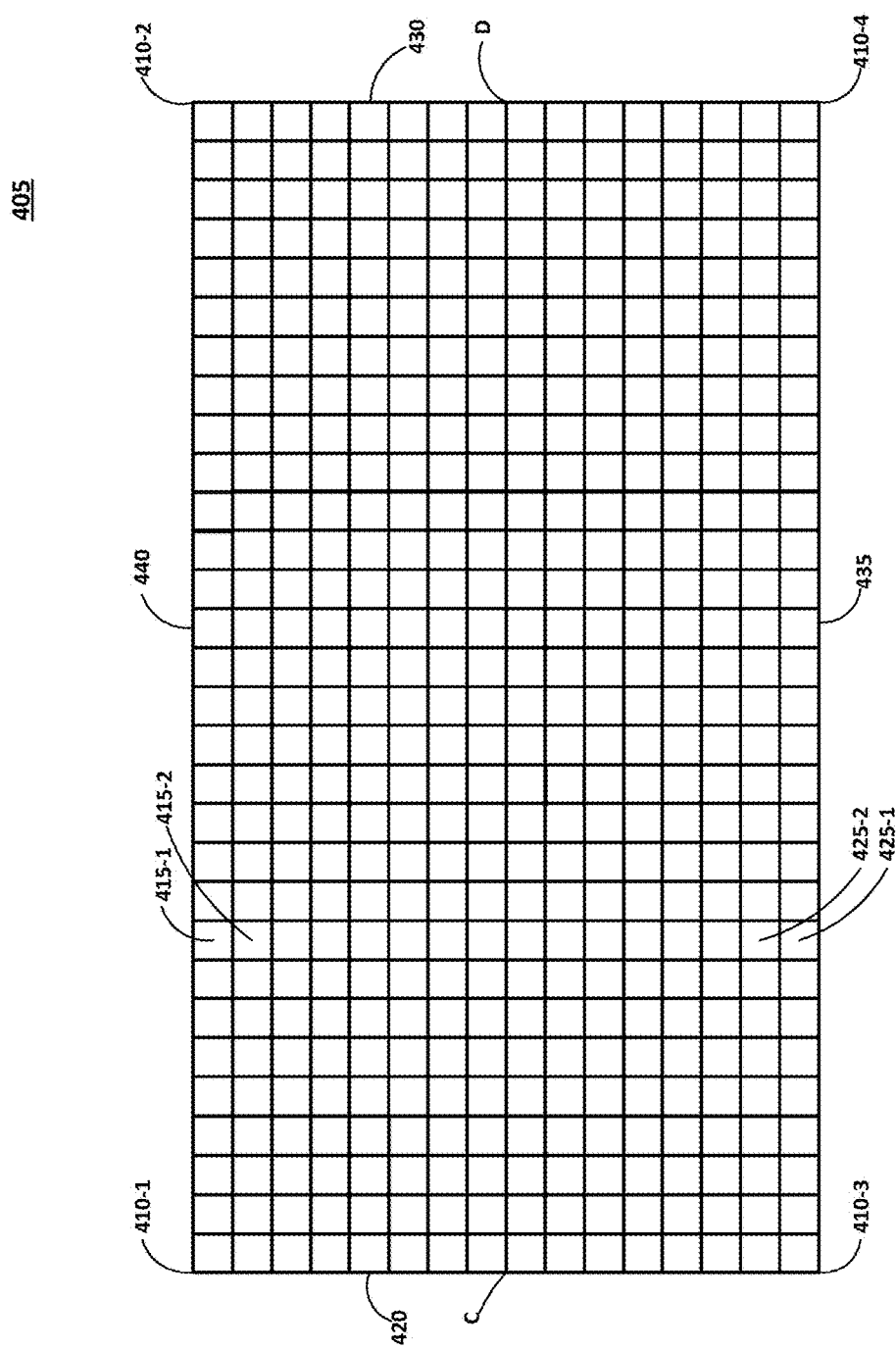
FIG. 4B illustrates block diagrams of an unwrapped video frame(s)/block(s) or image/block(s) according to at least one example embodiment.

In step S510 the cylindrical representation is unwrapped to a 2-D rectangular representation. For example, cylinder 400 may be separated at some vertical line and opened to form a rectangle. FIG. 4B illustrates an unwrapped cylindrical representation 405 as a 2-D rectangular representation. An equirectangular projection of an image shown as an unwrapped cylindrical representation 405 may appear as a stretched image as the image progresses vertically (up and down as shown in FIG. 4B) away from a mid line between points A and B. In a semi-equirectangular projection the image may appear as an oval with empty or null pixels filling a space inside or surrounding corner blocks 410-1, 410-2, 410-3, 410-4 of the unwrapped cylindrical representation 405.

In step S515 the 2-D rectangular representation is decomposed to a C×R matrix of N×N blocks. For example, as shown in FIG. 4B, the illustrated unwrapped cylindrical representation 405 is a 30×16 matrix of N×N blocks. However, other C×R dimensions are within the scope of this disclosure. The blocks may be 2×2, 4×4, 8×8, 16×16, and the like blocks (or blocks of pixels).

In step S520 null blocks are designated. For example, in a semi-equirectangular projection a number of blocks may include empty or null pixels. Blocks that include all, most, or a significant portion of empty or null pixels may be designated as null blocks. For example, if the blocks are 2×2 blocks, any blocks that include, for example, a threshold number or a percentage of empty or null pixels may be designated as null blocks. Null blocks may be stored in a table or look-up table. For example, null blocks may be stored in the look-up table 445 illustrated in FIG. 4C. As discussed below, null blocks may be excluded from use during intra/inter-prediction. If equirectangular projection is used, there may be no designation of null blocks.

As discussed above, a spherical image is an image that is continuous in all directions. Accordingly, if the spherical image were to be decomposed into a plurality of blocks, the plurality of blocks would be contiguous over the spherical image. In other words, there are no edges or boundaries as in a 2D image. In example implementations, an adjacent end block may be adjacent to a boundary of the 2D representation. In addition, an adjacent end block may be a contiguous block to a block on a boundary of the 2D representation. For example, the adjacent end block being associated with two or more boundaries of the two dimensional representation. In other words, because a spherical image is an image that is continuous in all directions, an adjacent end can be associated with a top boundary (e.g., of a column of blocks) and a bottom boundary in an image or frame and/or associated with a left boundary (e.g., of a row of blocks) and a right boundary in an image or frame.

For example, if equirectangular projection is used, an adjacent end block may be the block on the other end of the column or row. For example, as shown in FIG. 4B block 415-1 and 425-1 may be respective adjacent end blocks (by column) to each other. Further, block 435 and 440 may be respective adjacent end blocks (by column) to each other. Still further, block 420 and 430 may be respective adjacent end blocks (by row) to each other. As discussed below, adjacent end blocks may be used as a 1, 2, 3, . . . , n pixel boundary to the left and/or above the block to be encoded (herein after referred to as a template) for an intra-prediction scheme. Further, adjacent end blocks may be used as a prediction block for an inter-prediction scheme. In a semi-equirectangular projection a number of blocks may include null blocks. As a result, in semi-equirectangular projection some adjacent end blocks may not be used as a template for intra/inter-prediction scheme.

Figures 4C, 4D:
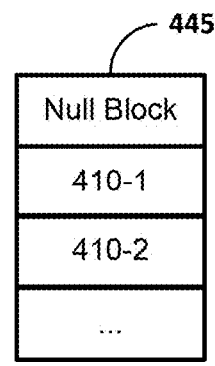
FIGS. 4C and 4D illustrate look up tables (LUT) according to at least one example embodiment.

Accordingly, in step S525 adjacent end blocks are associated. For example, as discussed above, in a semi-equirectangular projection a number of blocks may include empty or null pixels. Therefore, an end block in a row or column may not be at the top or bottom of a row and/or the left or right of a column. Accordingly, for blocks that are at the end of an image but not at the end of a column or row (e.g., block 415-2, where 415-1 is a null block), the adjacent end block may not be at the end of the other side of the column or row (e.g., block 425-2, where 425-1 is a null block). Therefore, the adjacent end blocks may be associated and stored in a lookup table (e.g., lookup table 450 as shown in FIG. 4D).

Exploiting spatial redundancy between samples within a frame (e.g., frame, image, slice, group of macroblocks) is referred to as intra-prediction. In intra-prediction a template can be generated from previously encoded and reconstructed blocks, pixels or sub-pixels (e.g., ½, ¼ and the like) in the same frame (or image). The template is subtracted from the current block prior to encoding. For example, with luminance (luma) samples, the template can be formed for each N×N (e.g., 4×4) sub-block or for an N×N (e.g., 16×16) macroblock. During encoding and/or decoding, the blocks or macroblocks can be sequentially coded within each frame or slice. According to example embodiments, spatial redundancy includes taking into account the continuous nature of the frame based on a spherical video or image. Accordingly, intra-prediction can use a template based on previously encoded and reconstructed blocks, pixels or sub-pixels (e.g., ½, ¼ and the like) across boundaries in the same frame (or image).

In intra-prediction, a coding pass can include sequentially coding blocks along a row (e.g., top to bottom), a column (e.g., left to right) or in a zig-zag pattern (e.g., starting from the upper left corner). In an intra-prediction scheme or coding pass, the blocks which are located above and to the left of the current block within the frame (or image), have been previously encoded and reconstructed. Accordingly, the blocks which are located above and to the left of the current block can be available to the encoder/decoder as a template. However, if the current block (or block to be encoded) is in the upper left corner of a frame, then no previous blocks have been previously encoded and reconstructed or decoded in the frame. Further, if the current block is in the upper row of a frame, then no neighbors above the current block (or block to be encoded) have been previously encoded and reconstructed or decoded. Still further, if the current block (or block to be encoded) is in the left column of a frame, then no neighbors on the same row as the current block have been previously encoded and reconstructed or decoded.

Exploiting spatial redundancy for samples between frames (e.g., frame, image, slice, group of macroblocks) is referred to as inter-prediction. In inter-prediction a prediction block can be generated in response to previously encoded and reconstructed blocks in a different (e.g., sequentially previous in time or a base/template) frame.

In inter-prediction, the current frame can be divided into blocks (e.g., macroblocks) of fixed size. To encode a block (e.g., a current block or block to be encoded) a best matching block is searched for in the reference frame. For example, the the search may include searching a search area of a reference frame. A comparison is made between the macroblock from in the current frame to possible candidate macroblocks to find a matching (e.g., a close or a good match) candidate macroblock. Candidate macroblocks can be checked (e.g., pixel by pixel and/or sub-pixel by sub-pixel) in the search area based on, for example, a desired motion estimation resolution, the difference between the macroblock of the current frame and the candidate macroblock, the processing cost of encoding the motion vector for that macroblock and the like. According to example embodiments, spatial redundancy includes taking into account the continuous nature of the frame based on a spherical video or image. Accordingly, inter-prediction can use a search area of a reference frame including blocks, pixels or sub-pixels (e.g., ½, ¼ and the like) across boundaries in the reference frame (or image) to select a best matching block, a candidate block and/or a prediction block.

Figure 7:
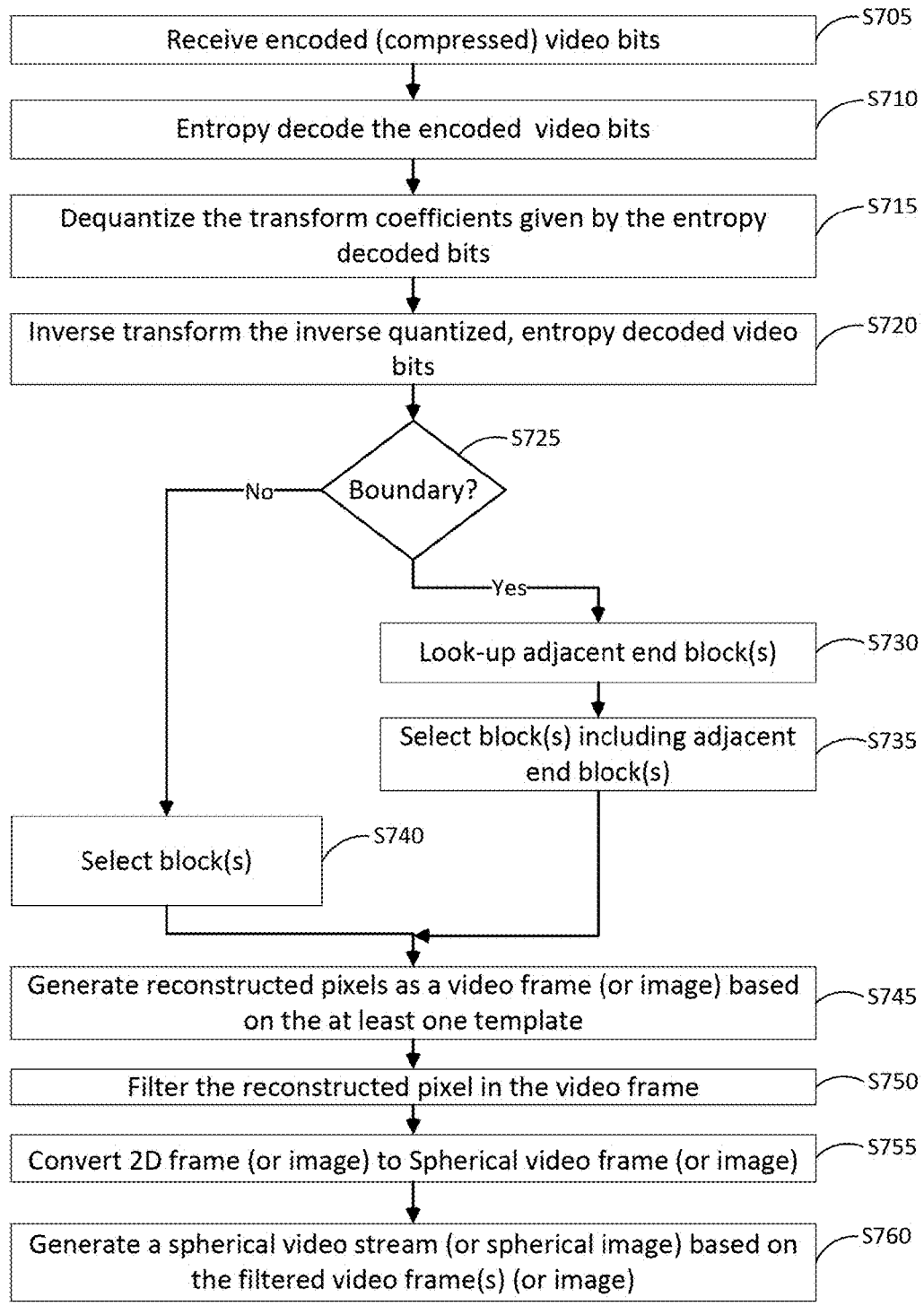

FIG. 7 is a flowchart of a method for encoding a video frame according to at least one example embodiment. As shown in FIG. 7, in step S605 a controller (e.g., controller 120) receives a 2-D rectangular representation of a spherical video sequence frame (or image) to encode. For example, the video encoder may receive a spherical video stream input 5, break the stream into a plurality of video frames, convert each frame to a 2-D rectangular representation (as discussed above with regard to FIG. 5) and select the first video frame. The controller may also set initial configurations. For example, the controller may set an intra-frame coding scheme or mode.

In step S610 whether or not a block is associated with a prediction scheme is at/on (or blocks include) a frame (or image) boundary of the 2-D rectangular representation is determined. The associated block (or blocks) may be one or more of an adjacent left and or upper block in an intra-prediction implementation. Alternatively, the block or blocks may be one or more blocks of or within a search area of a reference frame in an inter-prediction implementation. For example, in one example embodiment, a C×R matrix of N×N blocks includes pixels in each block (e.g., when an equirectangular projection is used). Accordingly, blocks in row 0, column 0, row R−1 and column C−1 include pixels of the spherical image. Therefore, if, during a scan or search, the C×R matrix of blocks includes pixels in each block (e.g., equirectangular projection) and the column/row=0 or the column/row=C−1/R−1, the block is at a boundary.

In another example implementation, an N×N matrix of blocks includes at least one null block or empty or null pixels in at least one block (e.g., when a semi-equirectangular projection is used). Therefore, if, during a scan or search, an adjacent block is a null block, the block is at a boundary. For example, to determine an adjacent block is a null block the adjacent block may be looked-up (e.g., searched for, identified) in a look-up table (e.g., LUT 445, 450). In this example scenario, a block is also at a boundary if the block is at column/row=0 or the column/row=A−1/B−1. If the block is at a boundary, processing moves to step S615. Otherwise, processing continues to step S625.

In step S615 an adjacent end block(s) is looked-up. For example, in one example implementation, a C×R matrix of N×N blocks includes pixels in each block (e.g., when a equirectangular projection is used). Accordingly, an adjacent end block associated with a column for a block in row 0 is a block in row R−1. Further, an adjacent end block associated with a column for a block in row R−1 is a block in row 0. An adjacent end block associated with a row for a block in column 0 is a block in column C−1. Lastly, an adjacent end block associated with a row for a block in column C−1 is a block in column 0. For example, in another example implementation, a C×R matrix of blocks that includes null blocks (e.g., when a semi-equirectangular projection is used). In this example column and row adjacent end blocks can be looked-up in a look-up table (e.g., LUT 450).

In step S620 at least one block including an adjacent end block is selected. In an intra-prediction scheme, at least one adjacent end block can be selected as the template. In other words, one or more of the 1, 2, 3, ..., n pixels to the left and/or above the block to be encoded can be selected from the template which can be selected from at least one adjacent end block. The adjacent end block being associated with two or more boundaries of the two dimensional representation.

The selecting of the adjacent end block can include selecting a reconstructed block from at least one of an opposite end of a same row as the block associated with the prediction scheme or an opposite end of a same column as the block to be encoded.

For example, the adjacent end block may be a reconstructed block other than a left reconstructed block or an upper reconstructed block of (or as compared to) the block to be encoded. In other words, an adjacent end block is not above or to the left of the block to be encoded during the intra-prediction scan of the un-encoded blocks. For example, as discussed above, during intra-prediction a template can be generated based on previously encoded and reconstructed blocks in the same frame (or image). The previously encoded and reconstructed block(s) may be selected from adjacent blocks (e.g., a block that is above and/or to the left of the block to be encoded) as a template. In this case, the block to be encoded is on the end of a column and/or row in the C×R matrix or is next to a null block (e.g., the above block is null or the left block is null). In other words, a block that would be used as a template does not exist or is a null block. Accordingly, at least one of the adjacent blocks to be selected as a template can be one of the looked-up adjacent end blocks.

In an inter-prediction scheme, at least one adjacent end block can be selected as a block within a search area of a reference frame. Accordingly, at least one adjacent end block can be selected as a best matching block, a candidate block and/or a prediction block.

In step S625 at least one block is selected. In this case, the at least one block does not include an adjacent end block. For example, in an intra-prediction scheme the previously encoded and reconstructed block(s) may be selected from adjacent blocks (e.g., a block that is above and/or to the left of the block to be encoded) as a template. In this case, the block to be encoded is away from the boundary. In other words, the block to be encoded is not on the end of a column and/or row in the C×R matrix and not next to a null block. Accordingly, at least one of the adjacent blocks to be selected as a template can be selected from a block above and/or to the left of the block to be encoded. For example, in an inter-prediction scheme the search area can be contiguous within the 2D frame. Accordingly, the search area can be selected without traversing a boundary of the 2D frame. Therefore, the search area does not include an adjacent end block.

In at least one example implementation, more than one block can be selected for use as a template. For example, in an intra-prediction scheme an adjacent block and a block adjacent (in the same direction) to the adjacent block can be selected (e.g., two blocks). The selected blocks can then be averaged to form a template block. In this example, it is possible for the template to be based on an adjacent block and an adjacent end block. For example, in an inter-prediction scheme the best matching block can be centered on a pixel with portions of a plurality of blocks forming the best matching block, the candidate block and/or the prediction block.

In step S630 a set of residuals for un-encoded pixels of the video sequence frame (or image) is generated based on the template. The set of residuals may be associated with one of an intra-prediction process or an inter-prediction process. For example, in the intra-prediction process, at least one value associated with each pixel may be subtracted from a corresponding value associated with a corresponding block (or pixel) of the selected template. For example, in the inter-prediction process, at least one value associated with each pixel may be subtracted from a corresponding value associated with a corresponding block (or pixel) of the selected best matching block, a candidate block and/or a prediction block.

In step S635 the un-encoded pixels are encoded. For example, the residuals for the un-encoded pixels may be transformed (encoded or compressed) into transform coefficients using a configured transform (e.g., a KLT, a SVD, a DCT or an ADST).

In step S640 the encoder quantizes the encoded set of residual values for the block. For example, the controller 120 may instruct (or invoke) the quantization block 220 to quantize coded motion vectors and the coded residual errors, through any reasonably suitable quantization techniques. In addition, at step S645, the controller 120 may instruct the entropy coding block 220 to, for example, assign codes to the quantized motion vector codes and residual error codes to match code lengths with the probabilities of the quantized motion vector codes and residual error codes, through any coding technique.

In step S650 the encoder outputs the coded (compressed) video frame(s). For example, the controller 120 may output the coded video (e.g., as coded video frames) to one or more output devices. The controller 120 may output the coded video as a single motion vector and a single set of predictor values (e.g., residual errors) for the macroblock. The controller 120 may output information indicating the mode or scheme use in intra-frame coding by the encoder. For example, the coded (compressed) video frame(s) may include a header for transmission. The header may include, amongst other things, the information indicating the mode or scheme use in intra-frame coding by the encoder. The intra-frame coding scheme or mode may be communicated with the coded (compressed) video frame(s) (e.g., in the header). The communicated intra-frame coding scheme or mode may indicate parameters used to convert each frame to a 2-D rectangular representation (e.g., indicate equirectangular projection or semi-equirectangular projection as well as any equations used). The communicated intra-frame coding scheme or mode may be numeric based (e.g., mode 101 may indicate semi-equirectangular projection with scaling factors a and b).

FIG. 7 is a flowchart of a method for decoding a video frame according to at least one example embodiment. As shown in FIG. 7, in step S705 a video decoder (e.g., video decoder 175) receives encoded (compressed) video bits (e.g., compressed video bits 10). For example, the encoded (compressed) video bits may be a previously encode (e.g., by video encoder 125) real time video spherical stream (e.g., a concert or sporting event recording) received via communication network (e.g., Internet or Intranet). For example, the video stream may also be a previously recorded video (e.g., a movie or a video recorder recording). The coded (compressed) video frame(s) may include a header for transmission. The header may include, amongst other things, the information indicating the mode or scheme use in intra-frame coding by the encoder. For example, the intra-frame coding scheme or mode may indicate parameters used to convert each frame to a 2-D rectangular representation (e.g., indicate equirectangular projection or semi-equirectangular projection as well as any equations used).

In step S710 the video decoder entropy decodes the encoded video bits. For example, the compressed video bits can be decoded by entropy decoding using, for example, Context Adaptive Binary Arithmetic Decoding to produce a set of quantized transform coefficients. In step S715 the video decoder de-quantizes the transform coefficients given by the entropy decoded bits. For example, the entropy decoded video bits can be de-quantized by mapping values within a relatively small range to values in a relatively large range (e.g. opposite of the quantization mapping described above). Further, in step S720 the video decoder inverse transforms the video bits using an indicated (e.g., in the header) transform (e.g., a KLT, a SVD, a DCT or an ADST).

In step S725 whether or not a block is associated with a prediction scheme is at/on (or blocks include) a frame (or image) boundary of the 2-D rectangular representation is determined. The associated block (or blocks) may be one or more of an adjacent left and or upper block in an intra-prediction implementation. Alternatively, the block or blocks may be one or more blocks of or within a search area of a reference frame in an inter-prediction implementation. For example, in one example embodiment, a C×R matrix of N×N blocks includes pixels in each block (e.g., when a equirectangular projection is used). Accordingly, blocks in row 0, column 0, row R−1 and column C−1 include pixels of the spherical image. Therefore, if, during a scan or search, the C×R matrix of blocks includes pixels in each block (e.g., equirectangular projection) and the column/row=0 or the column/row=C−1/R−1, the block is at a boundary.

In another example implementation, a C×R matrix of N×N blocks includes at least one null block or empty or null pixels in at least one block (e.g., when a semi-equirectangular projection is used). Therefore, if, during a scan or search, an adjacent block is a null block, the block is at a boundary. For example, to determine an adjacent block is a null block the adjacent block may be looked-up (or searched for) in a look-up table (e.g., LUT 445, 450). In this example scenario, a block is also at a boundary if the block is at column/row=0 or the column/row=C−1/R−1. If the block is at a boundary, processing moves to step S730. Otherwise, processing continues to step S740.

In step S730 an adjacent end block is looked-up. For example, in one example implementation, a C×R matrix of blocks includes pixels in each block (e.g., when a equirectangular projection is used). Accordingly, an adjacent end block associated with a column for a block in row 0 is a block in row R−1. Further, an adjacent end block associated with a column for a block in row R−1 is a block in row 0. An adjacent end block associated with a row for a block in row 0 is a block in column C−1. Lastly, an adjacent end block associated with a row for a block in column C−1 is a block in column 0. For example, in another example implementation, a C×R matrix of blocks that includes Null blocks (e.g., when a semi-equirectangular projection is used). In this example column and row adjacent end blocks can be looked-up (e.g., identified) in a look-up table (e.g., LUT 450).

In step S735 at least one block including an adjacent end block is selected. In an intra-prediction scheme, at least one adjacent end block can be selected as the template. In other words, one or more of the 1, 2, 3, . . . , n pixels to the left and/or above the block to be encoded can be selected from the template which can be selected from at least one adjacent end block. The adjacent end block being associated with two or more boundaries of the two dimensional representation. For example, the adjacent end block may be a reconstructed block other than a left reconstructed block or an upper reconstructed block of (or as compared to) the block to be encoded. In other words, an adjacent end block is not above or to the left of the block to be encoded during the intra-prediction scan of the un-encoded blocks. For example, as discussed above, during intra-prediction a template can be generated based on previously encoded and reconstructed blocks in the same frame (or image). The previously encoded and reconstructed block(s) may be selected from adjacent blocks (e.g., a block that is above and/or to the left of the block to be encoded) as a template. In this case, the block to be encoded is on the end of a column and/or row in the C×R matrix or is next to a null block (e.g., the above block is null or the left block is null). In other words, a block that would be used as a template does not exist or is a null block. Accordingly, at least one of the adjacent blocks to be selected as a template can be one of the looked-up adjacent end blocks.

In an intra-prediction scheme, at least one adjacent end block can be selected as a block within a search area of a reference frame. Accordingly, at least one adjacent end block can be selected as a best matching block, a candidate block and/or a prediction block.

In step S740 at least one block is selected. In this case, the at least one block does not include an adjacent end block. For example, in an intra-prediction scheme the previously encoded and reconstructed block(s) may be selected from adjacent blocks (e.g., a block that is above and/or to the left of the block to be encoded) as a template. In this case, the block to be encoded is not on the end of a column and/or row in the C×R matrix and not next to a null block. Accordingly, at least one of the adjacent blocks to be selected as a template can be selected from a block above and/or to the left of the block to be encoded. For example, in an inter-prediction scheme the search area can be contiguous within the 2D frame. Accordingly, the search area can be selected without traversing a boundary of the 2D frame. Therefore, the search area does not include an adjacent end block.

In at least one example implementation, more than one block can be selected for use as a template. For example, in an intra-prediction scheme an adjacent block and a block adjacent (in the same direction) to the adjacent block can be selected (e.g., two blocks). The selected blocks can then be averaged to form a template block. In this example, it is possible for the template to be based on an adjacent block and an adjacent end block. For example, in an inter-prediction scheme the best matching block can be centered on a pixel with portions of a plurality of blocks forming the best matching block, the candidate block and/or the prediction block.

In step S745 the video decoder generates reconstructed pixels as a video frame based the decoded video bits. In an intra-prediction scheme, the reconstructed pixels can be generated using the block as a template. In other words, one or more of the 1, 2, 3, . . . , n pixels to the left and/or above the block to be decoded can be can be selected from the block(s) and used as the template to generate reconstructed pixels from the decoded video bits. In an example implementation, the block (and, therefore, the 1, 2, 3, . . . , n pixels to the left and/or above the block to be decoded) can include adjacent end block(s). In an intra-prediction scheme, the reconstructed pixels can be generated using the block as a prediction block. Therefore, in an example implementation, the prediction block can include adjacent end block(s). For example, to generate the reconstructed pixels, the video decoder may add the residuals (e.g., transformed or decompressed video bits) to the corresponding position in the template or the prediction block resulting in a reconstructed pixel.

In step S750 the video decoder filters the reconstructed pixel in the video frame. For example, a loop filter can be applied to the reconstructed block to reduce blocking artifacts. For example, a deblocking filter can be applied to the reconstructed block to reduce blocking distortion.

In step S755 the 2D frame (or image) is converted to a spherical video frame (or image). For example, the 2D frame can be converted using the inverse of the technique described above with regard to mapping a spherical frame (or image) to a 2D representation of the spherical frame (or image). An example technique is described in more detail below with regard to FIG. 8.

In step S760 the video decoder generates a spherical video stream (or spherical image) based on the video frame(s). For example, at least one video frame of reconstructed converted pixels may be organized in a sequence to form a spherical video stream.

Figure 8:
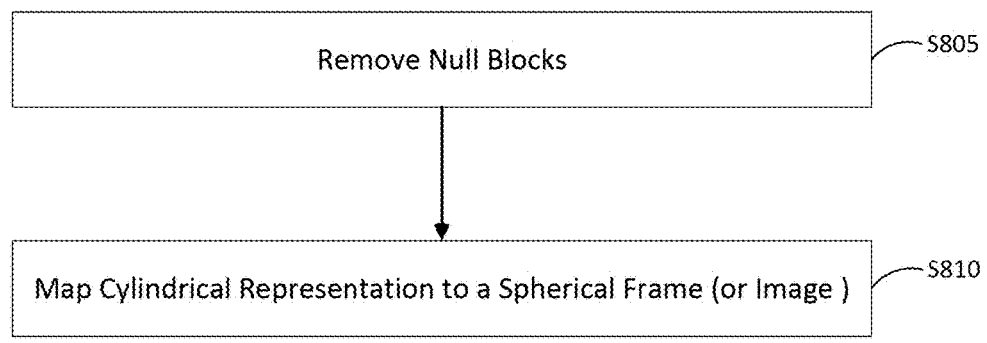
FIG. 8 is a flowchart of a method for converting a 2D representation of a spherical image to a spherical frame/image according to at least one example embodiment.

FIG. 8 is a flowchart of a method for converting a 2D representation of a spherical image to a spherical frame/image according to at least one example embodiment. As shown in FIG. 8, in step S805 null blocks are removed. For example, as discussed above, in a semi-equirectangular projection implementation null blocks may be added where there are no pixels in one or more of the N×N blocks in the C×R matrix. These null blocks may be skipped (e.g., during a processing of), deleted or removed from a 2D frame or image. The null blocks may be indicated in a look-up table (e.g., LUT 445) which may be included in a header associated with received coded (compressed) video frame(s). In an equirectangular projection implementation this step may be skipped.

In step S810 the 2D representation is mapped to a spherical frame (or image). For example, the cylindrical representation can be mapped to a spherical image using an inverse transformation (e.g., using the inverse of equations described above) based on what type of projection (e.g., equirectangular or semi-equirectangular) was used to convert the spherical image to the 2D representation. For example, the equations may be the inverse of $x=\lambda \cos \theta$ and $y=\theta$ where $\lambda$ is the longitude and $\theta$ is the latitude of $\lambda=x \cos y$ and $\theta=y$. Other inverse transforms are within the scope of this disclosure.

As will be appreciated, the system 100 and 150 illustrated in FIGS. 1A and 1B may be implemented as an element of and/or an extension of the generic computer device 900 and/or the generic mobile computer device 950 described below with regard to FIG. 9. Alternatively, or in addition to, the system 100 and 150 illustrated in FIGS. 1A and 1B may be implemented in a separate system from the generic computer device 900 and/or the generic mobile computer device 950 having some or all of the features described below with regard to the generic computer device 900 and/or the generic mobile computer device 950.

Figure 9:
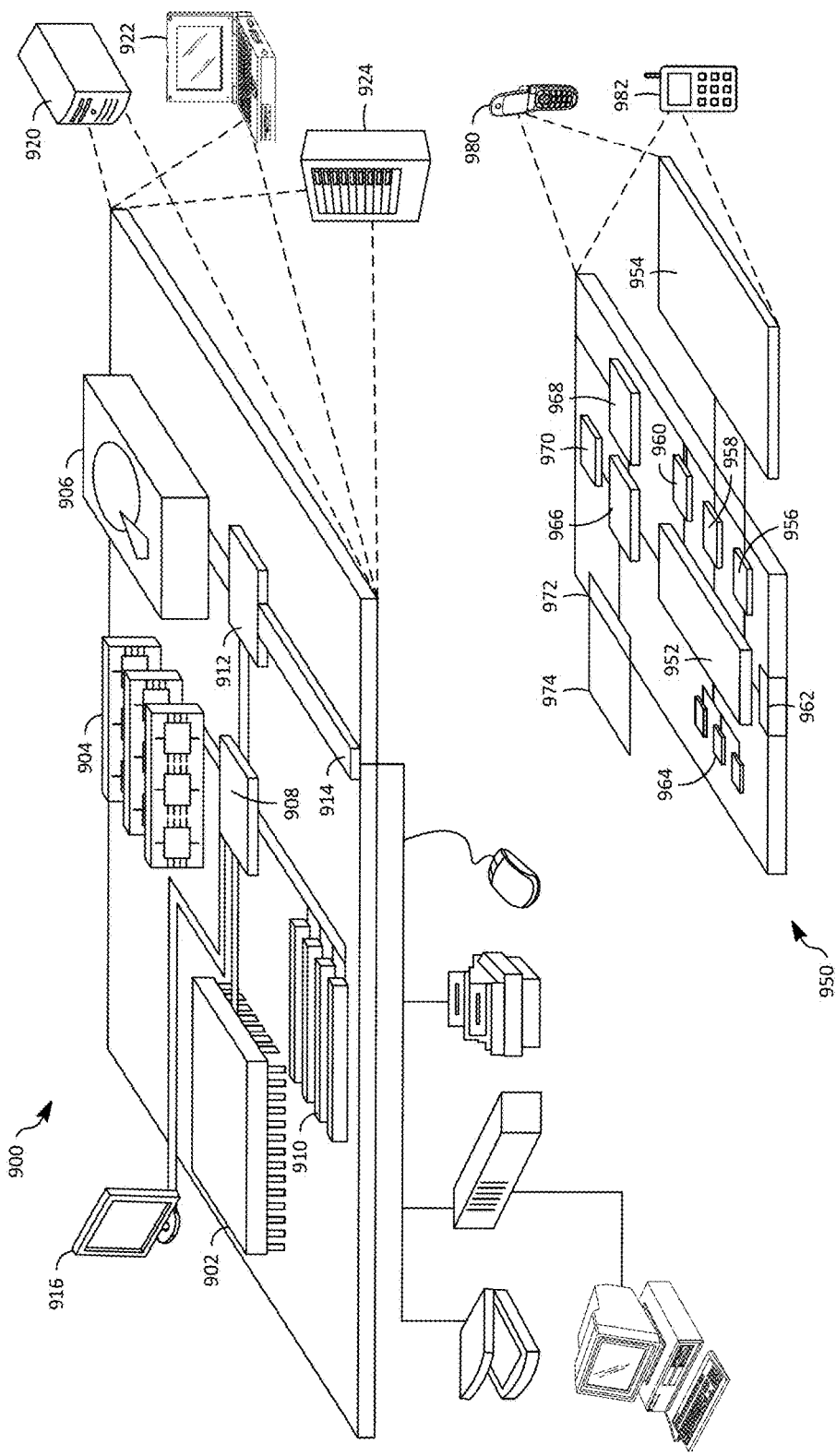
FIG. 9 is a schematic block diagram of a computer device and a mobile computer device that can be used to implement the techniques described herein.

FIG. 9 is a schematic block diagram of a computer device and a mobile computer device that can be used to implement the techniques described herein. FIG. 9 is an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing partitions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk and/or a non-transitory computer readable storage medium.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method for encoding a spherical video, the method comprising:
mapping a frame of the spherical video to a two dimensional representation based on a projection;
dividing the two dimensional representation into a matrix of blocks,
the matrix of blocks including a row of blocks including a first row end block in a first column of the matrix of blocks and a second row end block in the last column of the matrix of blocks, the first row end block including at least one pixel that is adjacent to at least one pixel in the second row end block in the spherical domain, and
the matrix of blocks including a column of blocks including a first column end block in a first row from the matrix of blocks and a second column end block in a last row from the matrix of blocks, the first column end block including at least one pixel that is adjacent to at least one pixel in the second column end block in a spherical domain;
determining a prediction process is one of an intra-prediction process or an inter-prediction process;
performing the prediction process including:
determining whether at least one block associated with a prediction scheme is on a boundary of the two dimensional representation, the at least one block associated with the prediction scheme is on the boundary if the at least one block is at least one of the first row end block, the second row end block, the first column end block or the second column end block,
in response to determining the at least one block associated with the prediction scheme is on the boundary, select an adjacent end block as a block including at least one pixel for use during the prediction process,
in response to determining the prediction process is an inter-prediction process, the at least one block associated with the prediction scheme is selected as a prediction block from a plurality of blocks in a reference frame to be searched, the plurality of blocks crossing a boundary of the reference frame,
the adjacent end block being associated with at least one of the first row end block, the second row end block, the first column end block and the second column end block,
in response to determining the prediction process is an intra-prediction process, the at least one block associated with the prediction scheme is a block to be encoded, and the adjacent end block is selected as one of a left reconstructed block or an upper reconstructed block of the block to be encoded;
generating at least one residual based on un-encoded pixels to be encoded;
encoding the at least one residual by applying a transform to the at least one residual;
quantizing transform coefficients associated with the encoded at least one residual;
entropy encoding the quantized transform coefficients as a compressed video bit stream; and
transmitting the compressed video bit stream including an indication of a technique used during the mapping of the frame of the spherical video to the two dimensional representation.

2. The method of claim 1, wherein
in response to determining, the prediction process is an inter-prediction process,
the at least one block associated with the prediction scheme is a block included in a plurality of blocks in a reference frame to be searched for a matching block.

3. The method of claim 1, wherein the mapping of the frame of the spherical video to the two dimensional representation includes using an equation based on an equirectangular projection.

4. The method of claim 1, wherein the mapping of the frame of the spherical video to the two dimensional representation includes using an equation based on a semi-equirectangular projection.

5. The method of claim 1, further comprising:
in response to determining the block to be encoded is away from the boundary, in an intra-prediction process, select an adjacent block as a template, the adjacent block being at least one of a left reconstructed block or an upper reconstructed block of the block to be encoded.

6. The method of claim 1, wherein the selecting of the adjacent end block includes selecting a reconstructed block from at least one of an opposite end of a same row as the block associated with the prediction scheme or an opposite end of a same column as the block to be encoded.

7. The method of claim 1, wherein the selecting of the adjacent end block includes selecting a reconstructed block from a look-up table.

8. A method for decoding a spherical video, the method comprising:
receiving an encoded bit stream including a header indicating a intra-frame coding mode, the intra-frame coding mode indicating a technique used during a conversion of a frame of a spherical video to a two dimensional representation;
entropy decoding the encoded bit stream to produce a set of quantized transform coefficients;
inverse quantizing the set of quantized transform coefficients to generate a set of transform coefficients;

inverse transforming the set of transform coefficients to generate at least one residual of un-encoded pixels;
dividing the two dimensional representation into a matrix of blocks,
the matrix of blocks including a row of blocks including a first row end block in a first column of the matrix of blocks and a second row end block in the last column of the matrix of blocks, the first row end block including at least one pixel that is adjacent to at least one pixel in the second row end block in the spherical domain, and
the matrix of blocks including a column of blocks including a first column end block in a first row from the matrix of blocks and a second column end block in a last row from the matrix of blocks, the first column end block including at least one pixel that is adjacent to at least one pixel in the second column end block in a spherical domain;
determining a prediction process is one of an intra-prediction process or an inter-prediction process;
performing the prediction process including:
determine whether at least one block associated with a prediction scheme is on a boundary of the two dimensional representation, the at least one block associated with the prediction scheme is on the boundary if the at least one block is at least one of the first row end block, the second row end block, the first column end block or the second column end block;
in response to determining the at least one block associated with the prediction scheme is on the boundary, select an adjacent end block as a block including at least one pixel for use during the prediction process,
in response to determining the prediction process is an inter-prediction process, the at least one block associated with the prediction scheme is selected as a prediction block from a plurality of blocks in a reference frame to be searched, the plurality of blocks crossing a boundary of the reference frame,
the adjacent end block being associated with the first row end block, the second row end block, the first column end block and the second column end block,
in response to determining the prediction process is an intra-prediction process, the at least one block associated with the prediction scheme is a block to be encoded, and the adjacent end block is selected as one of a left reconstructed block or an upper reconstructed block of the block to be encoded; and
converting the two dimensional representation to a frame of the spherical video based on a cylindrical projection.

9. The method of claim 8, wherein the converting of the two dimensional representation includes mapping the two dimensional representation to a spherical image using an equation based on inverse transformation of a projection.

10. The method of claim 8, wherein
in response to determining the prediction process is an inter-prediction process, and
the at least one block associated with the prediction scheme is a block included in a plurality of blocks in a reference frame to be searched for a matching block.

11. A non-transitory computer-readable storage medium having stored thereon computer executable program code which, when executed on a computer system, causes the computer system to perform steps comprising:
mapping a frame of a spherical video to a two dimensional representation based on a projection;
dividing the two dimensional representation into a matrix of blocks,
the matrix of blocks including a row of blocks including a first row end block in a first column of the matrix of blocks and a second row end block in the last column of the matrix of blocks, the first row end block including at least one pixel that is adjacent to at least one pixel in the second row end block in a spherical domain, and
the matrix of blocks including a column of blocks including a first column end block in a first row from the matrix of blocks and a second column end block in a last row from the matrix of blocks, the first column end block including at least one pixel that is adjacent to at least one pixel in the second column end block in the spherical domain;
determining a prediction process is one of an intra-prediction process or an inter-prediction process;
performing the prediction process including:
determine whether at least one block associated with a prediction scheme is on a boundary of the two dimensional representation, the at least one block associated with the prediction scheme is on the boundary if the at least one block is at least one of the first row end block, the second row end block, the first column end block or the second column end block; and
in response to determining the at least one block associated with the prediction scheme is on the boundary, select an adjacent end block as a block including at least one pixel for use during the prediction process,
in response to determining the prediction process is an inter-prediction process, the at least one block associated with the prediction scheme is selected as a prediction block from a plurality of blocks in a reference frame to be searched, the plurality of blocks crossing a boundary of the reference frame,
the adjacent end block being associated with at least one of the first row end block, the second row end block, the first column end block and the second column end block,
in response to determining the prediction process is an intra-prediction process, the at least one block associated with the prediction scheme is a block to be encoded, and the adjacent end block is selected as one of a left reconstructed block or an upper reconstructed block of the block to be encoded;
generating at least one residual based on un-encoded pixels to be encoded;
encoding the at least one residual by applying a transform to the at least one residual;
quantizing transform coefficients associated with the encoded at least one residual;
entropy encoding the quantized transform coefficients as a compressed video bit stream; and
transmitting the compressed video bit stream including an indication of a technique used during the mapping of the frame of the spherical video to the two dimensional representation.

12. The non-transitory computer-readable storage medium of claim 11, wherein
in response to determining the prediction process is an inter-prediction process, and
the at least one block associated with the prediction scheme is a block included in a plurality of blocks in a reference frame to be searched for a matching block.

13. The non-transitory computer-readable storage medium of claim 11, wherein the selecting of the adjacent end block includes selecting a reconstructed block from at least one of an opposite end of a same row as the block associated with the prediction scheme or an opposite end of a same column as the block to be encoded.

* * * * *